(12) United States Patent
Duan et al.

(10) Patent No.: US 9,717,265 B2
(45) Date of Patent: Aug. 1, 2017

(54) RUMEN-PROTECTED LUTEIN PRODUCT FOR PRODUCING HIGH-LUTEIN DAIRY PRODUCTS

(75) Inventors: Zhiyong Duan, Guandong (CN); Yongcai Liu, Guangxi (CN); Dong Chen, Beiliu (CN); Ye Lao, Zhuhai (CN)

(73) Assignee: KEMIN INDUSTRIES, INC., Des Moines, IA (US)

( * ) Notice: Subject to any disclaimer, the term of this patent is extended or adjusted under 35 U.S.C. 154(b) by 861 days.

(21) Appl. No.: 13/007,610

(22) Filed: Jan. 15, 2011

(65) Prior Publication Data

US 2012/0282367 A1    Nov. 8, 2012

Related U.S. Application Data

(60) Provisional application No. 61/295,422, filed on Jan. 15, 2010.

(51) Int. Cl.
| | | |
|---|---|---|
| A23K 1/18 | (2006.01) | |
| A23K 50/10 | (2016.01) | |
| A23K 40/20 | (2016.01) | |
| A23K 10/37 | (2016.01) | |
| A23K 20/179 | (2016.01) | |
| A23K 20/158 | (2016.01) | |
| A23K 20/28 | (2016.01) | |

(52) U.S. Cl.
CPC .............. *A23K 50/10* (2016.05); *A23K 10/37* (2016.05); *A23K 20/158* (2016.05); *A23K 20/179* (2016.05); *A23K 20/28* (2016.05); *A23K 40/20* (2016.05); *Y02P 60/877* (2015.11)

(58) Field of Classification Search
CPC .... A23K 50/10; A23K 20/158; A23K 20/179; A23K 20/28; A23K 40/20; A23K 10/37
USPC .............................. 426/2, 648, 541, 262, 807
See application file for complete search history.

(56) References Cited

U.S. PATENT DOCUMENTS

| | | | | |
|---|---|---|---|---|
| 2,198,214 | A * | 4/1940 | Musher .................. | A23K 30/12 100/903 |
| 2,256,914 | A * | 9/1941 | Whitcomb ............. | A23K 10/33 426/34 |
| 3,523,138 | A * | 8/1970 | Grant ............................. | 568/816 |
| 3,539,686 | A * | 11/1970 | Rosenberg .................... | 424/760 |
| 4,533,557 | A * | 8/1985 | Maruyama ........... | A23K 20/163 426/601 |
| 4,726,955 | A | 2/1988 | Horn et al. | |
| 5,202,136 | A * | 4/1993 | Evans et al. ..................... | 426/2 |
| 5,206,041 | A * | 4/1993 | Wellons ........................... | 426/2 |
| 5,290,560 | A * | 3/1994 | Autant et al. .................. | 424/438 |
| 5,827,652 | A | 10/1998 | Garnett et al. | |
| 6,245,366 | B1 * | 6/2001 | Popplewell et al. ............ | 426/96 |
| 6,309,677 | B1 * | 10/2001 | Gorenbein et al. .......... | 424/764 |
| 6,866,877 | B2 | 3/2005 | Clark et al. | |
| 7,297,356 | B2 | 11/2007 | Macgregor et al. | |
| 8,034,983 | B2 * | 10/2011 | Du et al. ....................... | 568/816 |
| 2002/0127259 | A1 | 9/2002 | Orthoefer | |
| 2003/0211221 | A1 | 11/2003 | Abril et al. | |
| 2005/0255147 | A1 * | 11/2005 | Geach .......................... | 424/442 |
| 2006/0127533 | A1 * | 6/2006 | Roos .................... | A23C 19/043 426/42 |
| 2007/0248683 | A1 * | 10/2007 | Funda .......................... | 424/496 |
| 2008/0125497 | A1 | 5/2008 | Hauptmann et al. | |
| 2009/0232933 | A1 * | 9/2009 | Nakazawa ........... | A23K 1/1813 426/2 |

FOREIGN PATENT DOCUMENTS

| | | |
|---|---|---|
| CN | 1483333 | 3/2004 |
| WO | WO 2009027850 A2 * | 3/2009 |

OTHER PUBLICATIONS

Ballet, N., J. C. Robert, and P. E. V. Williams. "19 Vitamins in Forages."Forage Evaluation in Ruminant Nutrition (2000): 399-431.*

"Vitamin A—Chemistry Department—Elmhurst College", 2 pages, dated Mar. 2003, downloaded from http://chemistry.elmhurst.edu/vchembook/532vitaminA.html.*

P. Noziere, B. Graulet, A. Lucas, B. Martin, P. Grolier and M. Doreau, Carotenoids for ruminants: From forages to dairy products, Animal Feed Science and Technology, 131 (2006) 418-450.

* cited by examiner

*Primary Examiner* — Chhaya Sayala
(74) *Attorney, Agent, or Firm* — Nyemaster Goode P.C.

(57) ABSTRACT

A rumen-protected carotenoid animal feed product is described that is free-flowing, resistant to ruminal degradation and effective at raising the carotenoid level in milk produced by the animal.

3 Claims, 4 Drawing Sheets

RUMEN-PROTECTED LUTEIN PRODUCT FOR PRODUCING HIGH-LUTEIN DAIRY PRODUCTS

This application claims priority to U.S. Patent Application 61/295,422, filed Jan. 15, 2011, and incorporates the same herein in its entirety by this reference.

The invention relates generally to supplementation of the diet with carotenoids and, more specifically, an animal feed product containing carotenoids that is resistant to degradation in the rumen and results in high amounts of the carotenoid in the milk of the animal.

The macula is a small area in the retina of the eye that is critical for vision. Exposure of eyes to sunlight may trigger the production of free radicals which leads to the damage of the macular area. During the aging process, the accumulation of damage of the macula is the major cause of age-related macular degeneration (Bernsteain P S, Burrow J, and Askew E W, Serum and Macular Response to Antioxidant Supplementation Versus a Carotenoid-Rich Dietary Intervention in Elderly (Conference Abstract). 157 (Final Program), 2002; Landrum J T and Bone R A, Lutein, Zeaxanthin, and the Macular Pigment, Arch Biochem Biophys, 385:28-40).

Solid research studies have shown that the carotenoids, lutein and zeaxanthin, in the macula can act as a strong antioxidant and thus protect the macula from the damage caused by sunlight due to their strong antioxidant effect. Lutein has also been shown to alleviate inflammation and to boost immune responses (Kim H W, Modulation of Humoral and Cell-Mediated Immune Response in the Canine, FASEB J. 1998: 10-690-701).

FloraGLO® (Kemin Industries, Inc., Des Moines, Iowa, US) is a form of purified, crystalline, free carotenoids, principally lutein and zeaxanthin, extracted from marigold flowers and launched as a human nutritional supplement. It has been widely used in baby formula, functional drinks, etc. Recent interest has seen in developing naturally produced high-carotenoid milk, as a differentiated product from carotenoid-fortified milk. Supplementation of carotenoids to dairy animals may yield high-carotenoid milk. It is expected that consumers may perceive naturally produced high-carotenoid milk as more natural than carotenoid-fortified milk. Carotenoids supplemented in unprotected form will be largely degraded by the rumen microorganisms and will not be available for the animal to absorb and secret into the milk. Hence, rumen protected carotenoids that can bypass the rumen and can reach the small intestine where it will get absorbed will then more likely be secreted into the milk by the animal.

The objective of this invention is a rumen-protected form of carotenoids for feeding to ruminant animals such that the carotenoids in the animal diet can successfully transfer into milk produced by the ruminant animal. Human consumption of the high-carotenoid milk will result in supplementation of the human by the carotenoids.

SUMMARY OF THE INVENTION

The invention consists of an animal feed containing carotenoids which have been modified to be resistant to degradation in the rumen of an animal and to result in high amounts of the carotenoids being present in milk produced by the animal. An oil that is solid at ambient temperatures is heated until melted. A carotenoid-containing oleoresin is combined with the melted oil to prepare a homogenous mixture. The mixture is allowed to cool until hardened or solidified. The cooled mixture is processed in an extruder to prepare a pelleted feed ingredient which is largely insoluble in water. When fed to a ruminant animal, carotenoids in the pelleted feed ingredient are resistant to degradation in the rumen but are absorbed by the animal after passing from the rumen. The carotenoids are found at elevated levels in the milk of the animal. The carotenoid-rich milk is useful as a source of the carotenoids to humans.

DETAILED DESCRIPTION OF PREFERRED EMBODIMENTS

Figure 1:
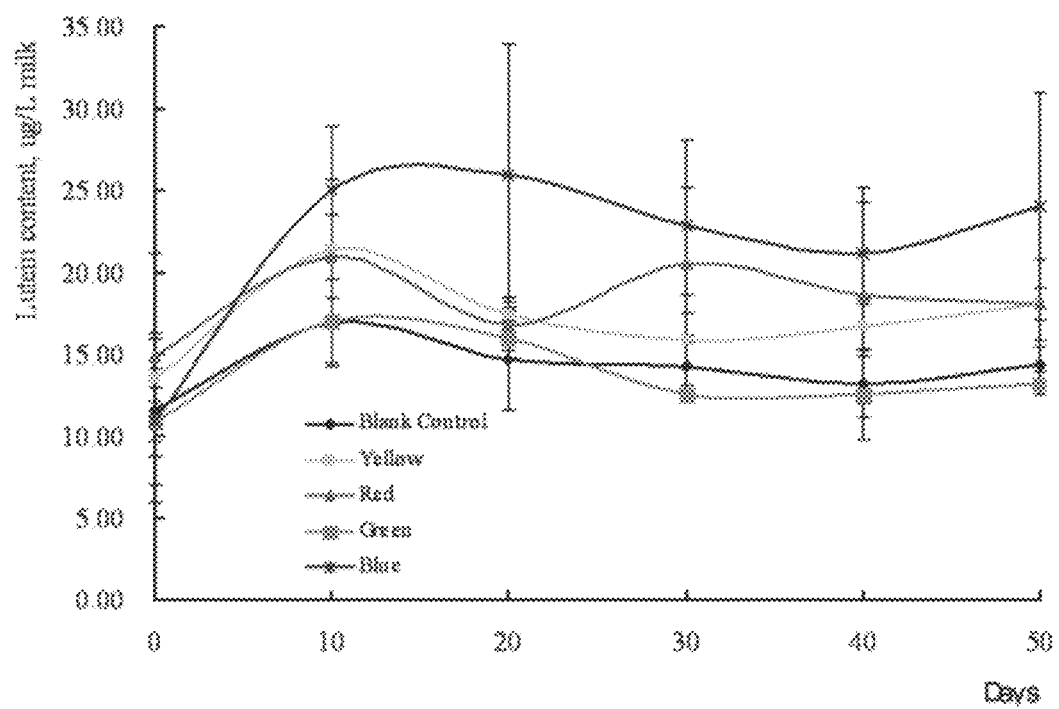
FIG. 1 is a chart of results of the animal trial of Example 1.

A commercially significant source of carotenoids for human and animal use is marigold (*Tagestes erecta*) flowers. The flowers have high levels of lutein and zeaxanthin and lesser amounts of a variety of other carotenoids in their esterified forms. Solvent extraction of dried marigold flowers yields an oleoresin containing the carotenoid esters that is in wide use as an animal feed supplement, particularly for chickens where the supplement adds a yellow color to the eggs and flesh found desirable in certain markets. An example of a commercial carotenoid ester oleoresin is OraGLO® (Kemin Industries, Inc., Des Moines, Iowa). Carotenoids in their non-esterified or free form can be produced from the oleoresin by a saponification reaction which separates the esters from the carotenoids. Carotenoid esters and especially free carotenoids, including lutein and zeaxanthin, have been recognized as contributing to eye health and are taken by a large number of people in the form of nutritional supplements. An alternative form of supplementing the diet with carotenoids has been the consumption of eggs produced by chickens that have been fed the carotenoid-rich oleoresin. Some consumers view the consumption of animal products, such as eggs, a preferred method of adding carotenoids to their diet over taking a nutritional supplement in the form of a tablet or capsule. Milk of ruminant animals, such as cattle and goats, is another animal product in which dietary carotenoid esters and free carotenoids are deposited and thus available as a human dietary source of carotenoids. However, carotenoids are subject to degradation in the rumen of these animals and so effective supplementation has not heretofore been feasible.

As used herein, "carotenoids" means esterified and non-esterified or free carotenoids suitable for human consumption and specifically includes esterified lutein and free lutein and esterified zeaxanthin and free zeaxanthin. A suitable source of carotenoids as a starting material in the present invention is a plant-derived oleoresin that contains either predominantly esterified carotenoids (for example, non-saponified marigold oleoresin) or predominantly free carotenoids (for example, saponified marigold oleoresin). Commercial marigold oleoresin at ambient temperatures is commonly a thick, non-flowing paste.

As used herein, "solid oil" means oil suitable for consumption by a dairy animal that has a melting or flow point above ambient or room temperatures. Solid oil includes vegetable oils and fats, and specifically including but not limited to hydrogenated vegetable oils, that have a melting point between 33° C. and 80° C., preferably between 44° C. and 74° C., and most preferably between 53° C. and 65° C.

As used herein, "carriers" means bulking agents and thickeners suitable for consumption by a dairy animal including but not limited to clays, silicates, silicon dioxide, talc powder, diatomaceous earth, hydrobiotite, and cellulosic materials, such as rice hulls and ground corn cobs.

As used herein, "mechanically processing" means use of a machine to convert a large mass of material into a plurality of similarly sized and shaped smaller masses that are suitable for consumption by a ruminant animal. Mechanical processing includes but is not limited to milling, grinding, chopping, pelleting and extruding.

The present invention comprises heating a solid oil above its melting point and admixing a source of carotenoids, preferably carotenoid-rich oleoresin to produce a suitably homogenous mixture, allowing the mixture to cool until it solidifies sufficiently to be extrudable, and then extruding the mixture to form an extrudate that is of a size and shape suitable for consumption by the target animal. The oleoresin may be heated to facilitate its admixture to the solid oil. Preferably, one or more carriers are added to the mixture or applied to the extrudate to improve its physical characteristics and further resist degradation in the rumen of the target animal.

Example 1

Materials and Methods
Material

Marigold oleoresin (saponified and non-saponified) was purchased from AV Thomas. The solid oil used was hydrogenated vegetable oil (HVO) (melting point 58-60° C.) purchased from Jiangshu Zhongding Chemicals Co. Ltd (China). The rest of the ingredients were all obtained commercially.
Equipment An extruder was used for the production of the rumen-protected carotenoids. The extruder was a Model E-50 supplied by Enger (Chongqing, China) with the following parameters (Table 1):

TABLE 1

The parameters of the extruder machine

| | | |
|---|---|---|
| Minimum batch size | Kg | 0.1 |
| Maximum capacity | Kg/h | ≤10 |
| Pore size | mm | Φ0.4-1.2 |
| Electricity | V/Hz | 380/50 |
| Electric power | Kw | 0.55 |
| Rolling speed | r/min | 5-72 |
| Recovery | % | ≥99% |
| Noise | db | <45 |
| Generator | Kw | 0.8 |
| Size (L × W × H) | mm | 500 × 400 × 610 |
| Total weight | Kg | 70 |
| Size (L × W × H) | mm | 425 × 290 × 600 |

Production Process

Five formulas were made and evaluated as described in Table 2. In brief, oleoresin (non-saponified or saponified) was heated under 80° C. for 8 hrs and HVO was heated under 100° C. for 16 hrs, and then blended with the other ingredients as listed in Table 2. Sixty kilograms of the mixture was placed in a stainless steel bucket, and then the bucket was put into cool water to cool the mixture to 45° C. or cooler to allow the mixture to solidify. The solidified mixture was milled and loaded into the extruder to produce extrudates containing the carotenoids present in the oleoresin.

The samples were first screened for their physical characteristics. It was desired that the product form solid pellets, with a density higher than water. It was also preferred that the samples be insoluble in water so that the carotenoids inside would not be accessible to microbial degradation in the rumen when fed to the target dairy animal.

TABLE 2

The formulas and physical characteristics of the test samples.

| | Sample 1 | Sample 2 | Sample 3 | Sample 4 | Sample 5 |
|---|---|---|---|---|---|
| Oleoresin (%) Saponified | 15 | 15 | | | 14.56 |
| Oleoresin (%) | | | 35 | 33.64 | |
| HVO (%) | 85 | 45 | 40 | 4.8 | 65.39 |
| Bentonite (%) | | 40 | 9 | 48.03 | |
| CC powder (%) | | | 6 | | |
| Hisil (%) | | | 10 | 9.61 | |
| Talc powder (%) | | | | 1.96 | 16.8 |
| Talc powder* (%) | | | | 1.96 | 2.86 |
| Dairy Lure (%) | | | | | 0.39 |
| Physical Characteristics | Pellets | Pellets | Sticky noodles | Pellets | Pellets |
| Water Solubility | Insoluble | Soluble | Soluble | Insoluble | Insoluble |
| Density | Too light | Good | Too light | Good | Good |

*Post-pelleting spray to prevent the caking of the pellets

Measurement of Lutein Level in Dairy Products

An HPLC method was used to determine the lutein level in dairy products.
Sample Preparation Two hundred (200) ml of fresh milk (4° C.) was loaded into 500-ml centrifuge tubes, balanced and then centrifuged at 5,000 g for 20 mins. The top layer of fat was transferred to centrifuge tubes and mixed with 10 ml of hexane and 5 ml 10% $Na_2SO_4$ water solution. Ten glass beads were added to help the vortex process for 10 minutes. The tube was then centrifuged at 10,000 rpm for 5 minutes and the supernatant was carefully transferred to the HPLC vials.
Conditions of HPLC The HPLC was equipped with an in-line degreaser, pump, autosampler, thermostat controlled column compartment, diode array detector, 250 mm×4.6 mm nitrile bonded Spherisorb column (5μ particles), and a guard column. A UV detector was used and set to 446 nm. The mobile phase used was hexane:acetone (80:20), with a flow rate of 1 ml/min, and an injection volume of 100 μl. The column compartment was at room temperature and an analysis time of 20 min was used.
Preparation of Standard Samples:

One mg of standard sample was weighed and dissolved in 100 ml of hexane:ethanol:acetone:methylbenzene (10:6:7:7) mixture. Dilute the standard sample to 0.02, 0.04, 0.08, 0.16 and 0.32 μg/ml. The standard curve was determined according to the chromatogram of the HPLC.
Animal Trial The animal trial was carried out in a selected dairy farm. The dairy farm had approximately 500 lactating cows in total, of which 60 cows were selected for the trial as designed below in Table 3.

The daily lutein intake was divided equally into 3 parts, and each part was fed to the corresponding cow together with the corn dough to ensure that the cow ate the whole ration of the lutein sample at 7 am, 3 pm and 9 pm.

The milk samples were collected on days 0, 10, 20, 30, 40 and 50. In brief, the milk from each replicate was pooled together and mixed and then 500 ml was taken from each pool. The milk was centrifuged at 5,000 g and the supernatant was collected and shipped for analysis, using the method as described above.

TABLE 3

The different treatments used in this animal trial

| Treatment | Number of Animals | Sample Name | Dosage (g/herd/day) |
|---|---|---|---|
| Control | 12 (3 reps * 4 animals) | — | — |
| Yellow | 12 | # 5 | 50 |
| Red | 12 | # 5 | 100 |
| Green | 12 | # 4 | 100 |
| Blue | 12 | # 5 | 150 |

Results
Determination of Lutein Level in Dairy Products

Several dairy products were collected from supermarket and the level of lutein was determined. Overall the lutein levels in the milk in Chinese market are generally lower than the group's raw milk. It is not clear whether this is because lutein is destroyed during the processing of milk, or simply because the cows in the group receive a higher level of alfalfa and pasture.

TABLE 4

The lutein level in different dairy products.

| Milk Samples | Microgram/L |
|---|---|
| Beijing Sample #1 | 1.44 |
| Beijing Sample #2 | 1.92 |
| Fresh Milk #1 | 1.33 |
| Fresh Milk #2 | 1.71 |
| Fresh Milk #3 | 1.34 |
| Group Raw Milk #1 | 12.7 |
| Group Raw Milk #2 | 14.5 |
| Group Raw Milk #3 | 10.2 |
| Cheese (imported) | 0.027 |
| Butter (Shanghai Bright) | 360 |
| Butter (US) | 215 |

The Appearance of the Products

The desired physical characteristics have been described in the Materials and Method section. The desired physical characteristics include solid pellets, with density no lower than water, and insolubility in water. Samples #4 and 5 both met these criteria. It had been reported that esterified lutein in plants could bypass the rumen better than free lutein could (Noziere P., Graulet B., Lucas A., Martin B., Grolier P. and Doreau M. 2006. Carotenoids for ruminants: From forages to dairy products. Animal Feed Science and Technology. 131: 418-450). To test this, Samples #4 and 5 were both produced and used in the animal trial, representing free carotenoids (principally lutein and zeaxanthin) and esterified carotenoids, respectively.

Results of Animal Trial

The results of the animal trial are shown in FIG. 1 and Table 5. Compared to the blank control, cows treated with Sample #5 showed significantly and numerically increased level of lutein in milk at the dosage of 150 g/d and 100 g/d, respectively. In contrast, the saponified free lutein failed to show any improvement in the milk lutein level.

A statistical analysis was run and the results are summarized in Table 5. The blue group (Sample #5 at 150 g/day/cow) consistently showed statistical improvement at increasing lutein level in milk ($P<0.5$). The Yellow and Red groups (which represent Sample #5 at 50 and 100 g/day/cow, respectively) showed numerical improvement but no statistical improvement. The Green group (Sample #4 at 100 g/day/cow) failed to show numerical improvement.

TABLE 5

The results of the animal trial carried out in one of the group's dairy farms, (Microgram/L)

| | Day-0 | Day-10 | Day-20 | Day-30 | Day-40 | Day-50 |
|---|---|---|---|---|---|---|
| Control | 11.64 ± 4.66 | 16.92 ± 2.69B | 14.66 ± 3.02Bb | 14.25 ± 1.92BCab | 13.19 ± 2.06B | 14.36 ± 1.55Bb |
| Yellow | 13.54 ± 0.60 | 21.38 ± 4.27AB | 17.47 ± 0.71Bab | 15.84 ± 2.74BCab | 16.65 ± 1.72AB | 18.09 ± 2.65ABab |
| Red | 14.95 ± 6.19 | 20.91 ± 2.56AB | 16.85 ± 1.63Bab | 20.49 ± 4.71ABab | 18.64 ± 6.60AB | 18.07 ± 0.94ABab |
| Green | 10.9 ± 1.21 | 17.02 ± 2.54B | 15.94 ± 1.13Bab | 12.57 ± 0.23Cb | 12.59 ± 2.76B | 13.21 ± 0.70Bb |
| Blue | 10.97 ± 5.02 | 24.97 ± 3.99A | 25.92 ± 8.01Aa | 22.83 ± 5.27Aa | 21.18 ± 3.07A | 24.05 ± 6.92Aa |
| S.E.M. | 2.41 | 1.90 | 2.28 | 2.02 | 2.13 | 1.98 |
| P | 0.7030 | 0.0649 | 0.0385 | 0.0236 | 0.0774 | 0.0230 |

A, B, C Means different letters within a column differ, $P < 0.05$
a, b Means different letters within a column differ significantly, $P < 0.01$ Discussions and Conclusions In this research, two forms of rumen-bypass carotenoids were produced, one from free carotenoids and one from carotenoid esters. Both forms were used to treat dairy cows, and the lutein levels in these treatments were determined. It was concluded that the carotenoid ester form is more resistant than the free carotenoid form against ruminal degradation. The carotenoid ester form of rumen-bypass carotenoids was effective at raising the lutein level in milk.

Example 2

Materials and Methods.

A total of 64 cows were selected and randomly divided into four groups, named as Blank Control and Treatments 1-3. In each group, 16 animals were divided into 4 replicated averagely. In Treatment 1 and 2, the diets were treated with Sample #5 at the dosage of 15 and 20 Kg/ton of concentrate supplements, respectively. In Treatment 3, a dosage of Sample #5 at 20 Kg/ton of concentrate supplement was applied for 10 days, and then the dosage was decreased to 15 Kg/ton of concentrate supplement.

The trial lasted for 40 days. Diets were treated with Sample #5 in the first 30 days, and in the last 10 days, application of Sample #5 was stopped.

The milk samples were collected on days 0, 5, 10, 20, 30 and 40. In brief, the milk from each replicate was pooled together and mixed and then 500 ml was taken from each pool. The milk was centrifuged at 5,000 g and the supernatant was collected for lutein analysis.

Results and Discussion.

Figure 2:
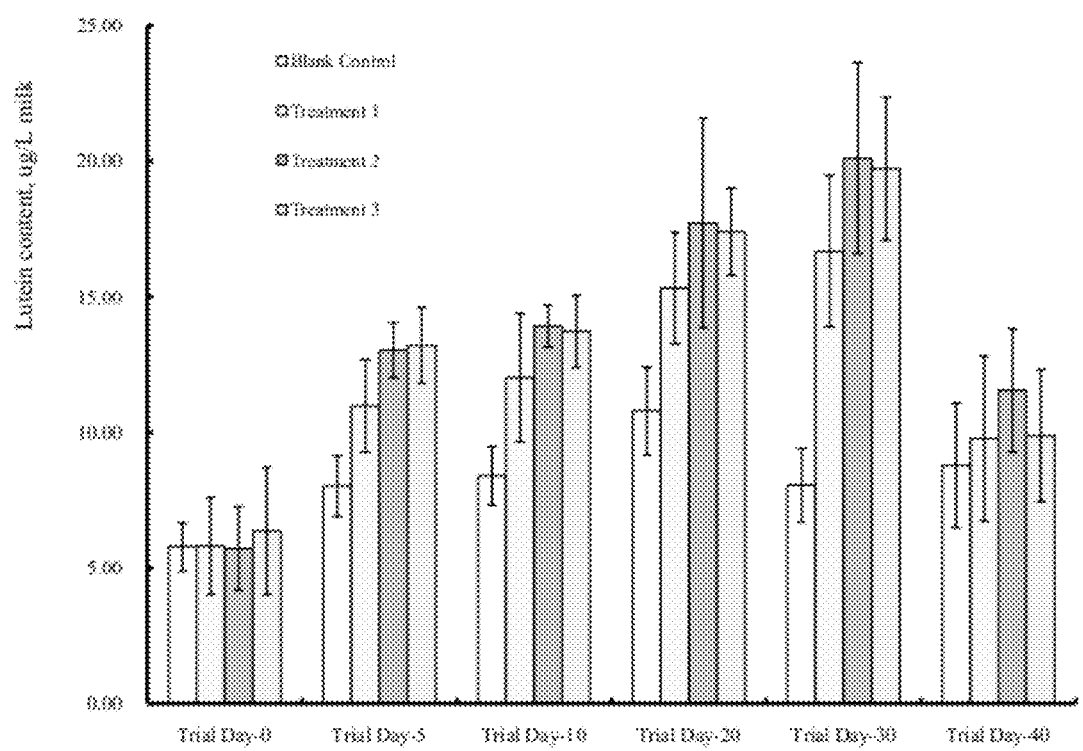
FIG. 2 is a chart of results of the animal trial of Example 2.

Results are presented as FIG. 2. A significant increase was obtained on the level of milk lutein after using Sample #5 for 5 days. The lutein level decreased sharply after the application of Sample #5 was stopped, which indicated the high level of milk lutein was led by the supplemented Sample #5. The most effective application plan of Sample #5 is to supply Sample #5 in concentrate supplement at 20 Kg/ton for 10 days and then decrease the dosage to 15 Kg/ton of concentrate supplement.

Example 3

Materials and Methods.

A total of 64 cows were selected and randomly divided into four groups, named as Blank Control and Treatment 1-3. In each group, 16 animals were divided into 4 replicated averagely. In Treatment 1 and 2, the diets were treated with Sample #5 at the dosage of 15 and 20 Kg/ton of concentrate supplements, respectively. In Treatment 3, a dosage of Sample #5 at 20 Kg/ton of concentrate supplement was applied for 10 days, and then the dosage was decreased to 15 Kg/ton of concentrate supplement.

The trial lasted for 60 days. Diets were treated with Sample #5 in the first 50 days, and in the last 10 days, application of Sample #5 was stopped.

The milk samples were collected on days 0, 5, 10, 20, 30, 40 50 and 60. In brief, the milk from each replicate was pooled together and mixed and then 500 ml was taken from each pool. The milk was centrifuged at 5,000 g and the supernatant was collected for lutein analysis. Somatic Cell Count (SCC) was also analyzed to study the effect of Sample #5 on the health condition of dairy cows.

Results and Discussion.

Figure 3A:
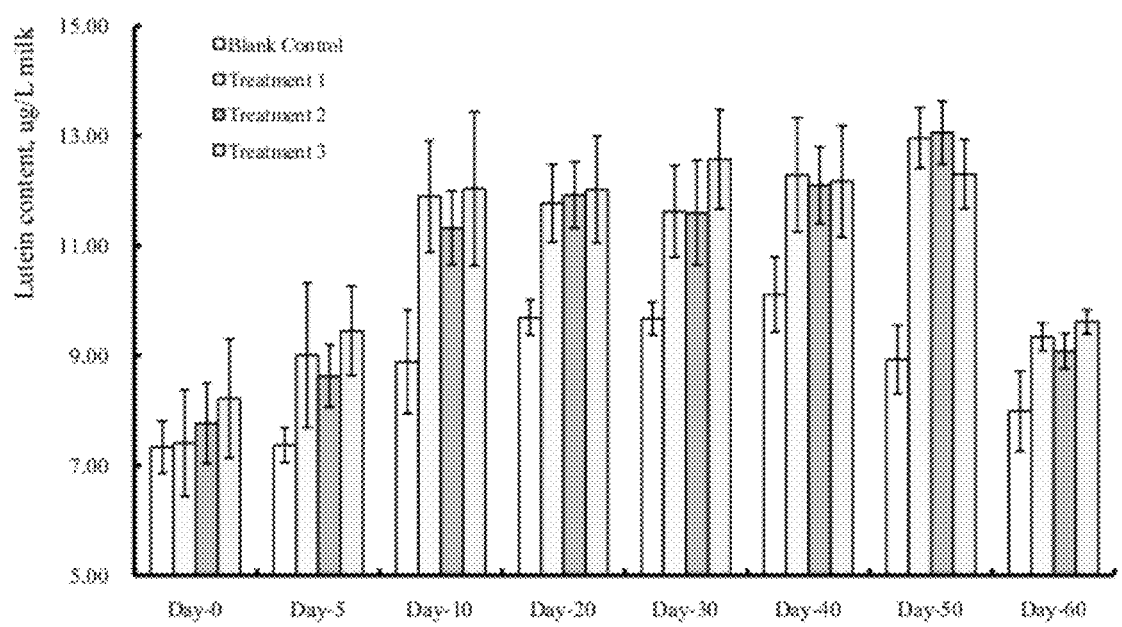
FIGS. 3a and 3b are charts of the results of the animal trial of Example 3 and a chart of the somatic cell count in the animals of Example 3, respectively.
Figure 3B:
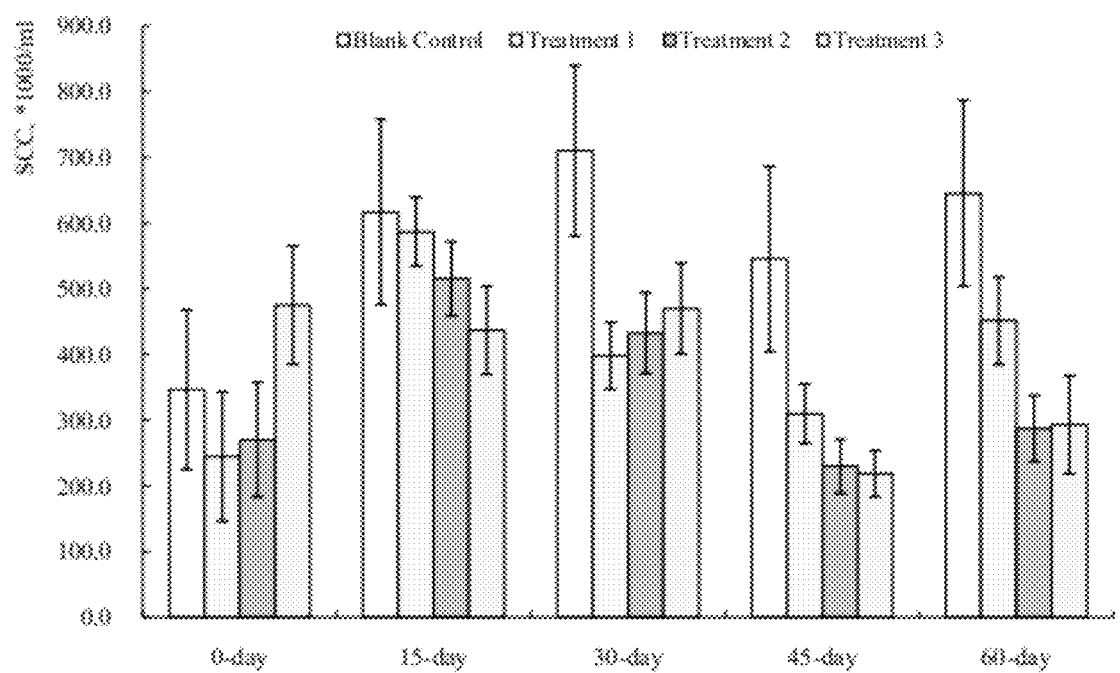

Results are given in FIGS. 3a and 3b. Similar to the results of Example 2, Sample #5 increased the level of milk lutein significantly in 5 days and stopping the application of Sample #5 led to a sharp decrease in the level of milk lutein (FIG. 3a). The most cost-effective application plan of Sample #5 is to supply Sample #5 in concentrate supplement at 20 Kg/ton for 10 days and then decrease the dosage to 15 Kg/ton of concentrate supplement. Decreased SCC suggested that application of Sample #5 improved the health condition of dairy cows (FIG. 3b).

The foregoing description and drawings comprise illustrative embodiments of the present inventions. The foregoing embodiments and the methods described herein may vary based on the ability, experience, and preference of those skilled in the art. Merely listing the steps of the method in a certain order does not constitute any limitation on the order of the steps of the method. The foregoing description and drawings merely explain and illustrate the invention, and the invention is not limited thereto, except insofar as the claims are so limited. Those skilled in the art who have the disclosure before them will be able to make modifications and variations therein without departing from the scope of the invention.

We claim:

1. A method of increasing the level of a carotenoid in the milk of a ruminant animal by protecting the carotenoid against degradation in the rumen of the ruminant animal, comprising the steps of:
   (a) heating a solid oil above its melting point;
   (b) admixing a carotenoid ester-containing oleoresin into the melted oil;
   (c) cooling the mixture until it solidifies;
   (d) mechanically processing the solid mixture into an animal feed composition; and
   (e) feeding the animal feed composition to a ruminant animal wherein the level of the carotenoid in the milk of the ruminant animal is increased.

2. The method of claim 1, further comprising admixing a carrier combined with the oleoresin and solid oil.

3. The method of claim 1, wherein the step of feeding the animal feed composition to a ruminant animal is at a rate to deliver between 50 g and 150 g of carotenoid ester per day to the ruminant animal.

* * * * *